(12) United States Patent
Etou

(10) Patent No.: US 7,448,462 B2
(45) Date of Patent: Nov. 11, 2008

(54) SNOWMOBILE EXHAUST SYSTEM

(75) Inventor: Toyochika Etou, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 367 days.

(21) Appl. No.: 11/335,264

(22) Filed: Jan. 19, 2006

(65) Prior Publication Data

US 2006/0175107 A1 Aug. 10, 2006

(30) Foreign Application Priority Data

Jan. 21, 2005 (JP) ............................. 2005-013723

(51) Int. Cl.
*B62M 27/02* (2006.01)
(52) U.S. Cl. .................. 180/190; 180/182; 180/186; 180/309
(58) Field of Classification Search ................ 180/190, 180/182, 186, 309
See application file for complete search history.

(56) References Cited

U.S. PATENT DOCUMENTS

| | | |
|---|---|---|
| 3,041,149 A | 6/1962 | Houdry |
| 3,220,805 A | 11/1965 | Fowler |
| 3,402,550 A | 9/1968 | Behrens |
| 3,779,327 A | 12/1973 | Pereault |
| 3,795,287 A | 3/1974 | Rose |
| 4,046,219 A | 9/1977 | Shaikh |
| 4,121,552 A | 10/1978 | Mithuo et al. |
| 4,125,997 A | 11/1978 | Abthoff et al. |
| 4,186,819 A | 2/1980 | Nowak et al. |
| 4,202,297 A | 5/1980 | Oku et al. |
| 4,249,626 A | 2/1981 | Fields et al. |
| 4,285,311 A | 8/1981 | Iio |
| 4,321,893 A | 3/1982 | Yamamoto |
| 4,325,335 A | 4/1982 | Shibata |
| 4,333,431 A | 6/1982 | Iio et al. |
| 4,340,123 A | 7/1982 | Fujikawa |
| 4,341,188 A | 7/1982 | Nerstrom |
| 4,364,346 A | 12/1982 | Shiohara |
| 4,368,703 A | 1/1983 | Shibata |
| 4,388,894 A | 6/1983 | Tanaka et al. |
| 4,397,272 A | 8/1983 | Omote |
| 4,418,782 A | 12/1983 | Nakazima |
| 4,516,540 A | 5/1985 | Nerstrom |
| 4,653,270 A | 3/1987 | Takii |
| 4,658,795 A | 4/1987 | Kawashima et al. |
| 4,671,220 A | 6/1987 | Inoue et al. |
| 4,766,866 A | 8/1988 | Takii et al. |

(Continued)

FOREIGN PATENT DOCUMENTS

EP 0152153 8/1995

(Continued)

*Primary Examiner*—Lesley D. Morris
*Assistant Examiner*—Michael R Stabley
(74) *Attorney, Agent, or Firm*—Knobbe, Martens Olson & Bear, LLP

(57) ABSTRACT

An exhaust system for a snowmobile is provided. The exhaust system has an exhaust pipe that extends above a track belt from an engine to a rearward portion of the snowmobile. The exhaust pipe includes a tail pipe having an outlet to the atmosphere. The rearward portion of the snowmobile includes a space that has an opening that faces the track belt. The tail pipe is located in the space.

25 Claims, 10 Drawing Sheets

U.S. PATENT DOCUMENTS

| | | | |
|---|---|---|---|
| 4,779,415 | A | 10/1988 | Richardson et al. |
| 4,785,626 | A | 11/1988 | Shiraishi |
| 4,793,347 | A | 12/1988 | Taniuchi et al. |
| 4,795,420 | A | 1/1989 | Sakurai et al. |
| 4,809,647 | A | 3/1989 | Masumoto et al. |
| 4,869,063 | A | 9/1989 | Sakurai et al. |
| 4,892,164 | A | 1/1990 | Yasui et al. |
| 4,909,193 | A | 3/1990 | Boyesen |
| 4,917,207 | A | 4/1990 | Yasui et al. |
| 4,930,678 | A | 6/1990 | Cyh |
| 4,939,898 | A | 7/1990 | Ichimura et al. |
| 4,957,664 | A | 9/1990 | Kohno et al. |
| 4,986,780 | A | 1/1991 | Sougawa |
| 4,998,512 | A | 3/1991 | Masuda et al. |
| 4,999,999 | A | 3/1991 | Takahashi et al. |
| 5,000,131 | A | 3/1991 | Masuda |
| 5,010,731 | A | 4/1991 | Onishi |
| 5,018,503 | A | 5/1991 | Hoshiba et al. |
| 5,048,471 | A | 9/1991 | Takii et al. |
| 5,063,887 | A | 11/1991 | Ozawa et al. |
| 5,063,888 | A | 11/1991 | Ozawa et al. |
| 5,094,217 | A | 3/1992 | Kaku et al. |
| 5,117,932 | A | 6/1992 | Kurosu et al. |
| 5,129,473 | A | 7/1992 | Boyer |
| 5,152,255 | A | 10/1992 | Fukuda |
| 5,152,365 | A | 10/1992 | Aoshima |
| 5,183,013 | A | 2/1993 | Ito et al. |
| 5,190,006 | A | 3/1993 | Motoyama et al. |
| 5,190,148 | A | 3/1993 | Williams |
| 5,212,949 | A | 5/1993 | Shiozawa |
| 5,220,890 | A | 6/1993 | Koriyama |
| 5,240,649 | A | 8/1993 | Yamada et al. |
| 5,251,718 | A | 10/1993 | Inagawa et al. |
| 5,279,381 | A | 1/1994 | Fukuda |
| 5,285,639 | A | 2/1994 | Araki et al. |
| 5,322,044 | A | 6/1994 | Maebashi |
| 5,365,908 | A | 11/1994 | Takii et al. |
| 5,400,755 | A | 3/1995 | Maebashi |
| 5,410,993 | A | 5/1995 | Masuda et al. |
| 5,443,547 | A | 8/1995 | Morikawa |
| 5,537,958 | A | 7/1996 | Nishimura et al. |
| 5,575,246 | A | 11/1996 | Ito |
| 5,588,402 | A | 12/1996 | Lawrence |
| 5,598,813 | A | 2/1997 | Masuda et al. |
| 5,605,119 | A | 2/1997 | Masuda et al. |
| 5,660,152 | A | 8/1997 | Masuda |
| 5,709,177 | A | 1/1998 | Worth et al. |
| 5,715,794 | A | 2/1998 | Nakamura et al. |
| 5,746,049 | A | 5/1998 | Cullen et al. |
| 5,746,173 | A | 5/1998 | Takii et al. |
| 5,782,214 | A | 7/1998 | Nanami et al. |
| 5,804,147 | A | 9/1998 | Blanchet et al. |
| 5,814,283 | A | 9/1998 | Matuoka et al. |
| 5,822,976 | A | 10/1998 | Cockerill |
| 5,827,096 | A | 10/1998 | Mineo |
| 5,862,662 | A | 1/1999 | Fukuda et al. |
| 5,878,702 | A | 3/1999 | Motoyama et al. |
| 5,934,958 | A | 8/1999 | Ochiai |
| 5,957,230 | A | 9/1999 | Harano et al. |
| 5,961,294 | A | 10/1999 | Hataura et al. |
| 5,992,552 | A | 11/1999 | Eto |
| 5,997,373 | A | 12/1999 | Asai et al. |
| 6,000,217 | A | 12/1999 | Hochmuth |
| 6,007,392 | A | 12/1999 | Motose |
| 6,021,748 | A | 2/2000 | Motose |
| 6,039,013 | A | 3/2000 | Motose |
| 6,109,217 | A | 8/2000 | Hedlund et al. |
| 6,134,885 | A | 10/2000 | Gilbertson |
| 6,155,374 | A | 12/2000 | Uchida |
| 6,167,700 | B1 | 1/2001 | Lampert |
| 6,216,809 | B1 | 4/2001 | Etou et al. |
| 6,227,323 | B1 | 5/2001 | Ashida |
| 6,227,922 | B1 | 5/2001 | Ochiai |
| 6,237,566 | B1 | 5/2001 | Spaulding |
| 6,250,281 | B1 | 6/2001 | Takii et al. |
| 6,263,991 | B1 | 7/2001 | Savage et al. |
| 6,523,342 | B2 | 2/2003 | Küper et al. |
| 6,622,671 | B2 | 9/2003 | Uchida |
| 6,655,134 | B2 | 12/2003 | Nakayasu et al. |
| 6,802,383 | B2 * | 10/2004 | Nishijima .................. 180/190 |
| 6,808,034 | B2 | 10/2004 | Nakano et al. |
| 6,848,529 | B2 * | 2/2005 | Moriyama .................. 180/291 |
| 6,904,990 | B2 | 6/2005 | Etou |
| 6,926,107 | B2 | 8/2005 | Nishijima |
| 7,171,804 | B2 | 2/2007 | Terashima |
| 7,306,067 | B2 * | 12/2007 | Yamamoto .................. 180/186 |
| 2001/0010804 | A1 | 8/2001 | Majima |
| 2002/0134603 | A1 * | 9/2002 | Ashida et al. ............... 180/186 |
| 2005/0205334 | A1 * | 9/2005 | Moriyama .................. 180/291 |
| 2006/0150617 | A1 | 7/2006 | Nishimura et al. |
| 2006/0162977 | A1 | 7/2006 | Etou |

FOREIGN PATENT DOCUMENTS

| | | |
|---|---|---|
| JP | 53-59014 | 5/1978 |
| JP | 63212728 | 9/1988 |
| JP | 02-37110 | 2/1990 |
| JP | 02-75721 | 3/1990 |
| JP | 09-133016 | 5/1997 |
| JP | 2001-173437 | 6/2001 |
| JP | 2002-178980 | 6/2002 |

* cited by examiner

SNOWMOBILE EXHAUST SYSTEM

CROSS-REFERENCE TO RELATED APPLICATIONS

This application claims priority under 35 U.S.C. §119(a) to Japanese Patent Application Serial No. 2005-013723, filed Jan. 21, 2005, the entire contents of which is hereby incorporated by reference.

BACKGROUND OF THE INVENTION

1. Field of the Invention

The application relates to an exhaust system of a snowmobile that has an exhaust pipe extending above a track belt from an engine compartment to a rearward portion of a vehicle frame.

2. Description of the Related Art

Conventional snowmobiles provide a seat for a rider on an upper part of the vehicle body from which the rider can grip a front steering handle. In such snowmobiles, an engine typically is mounted in an engine compartment located in a forward portion of the vehicle body. Exhaust gas generally is discharged below the engine compartment. However, in this arrangement, most of the heaviest components of the snowmobile, e.g., the engine and the exhaust pipe, are positioned at the forward portion of the vehicle body. As such, the weight of the forward portion of the vehicle body is large compared to the weight of the rearward portion.

In one prior design, a snowmobile is arranged such that the weight balance is improved by positioning a muffler and a substantial portion of the exhaust pipe at a rearward portion of the vehicle body. In this prior design, the engine is mounted in the engine compartment in the forward portion of the vehicle body. Other components that form an external portion of the vehicle, e.g., the external surface of the snowmobile, such as the fuel tank and the seat, are positioned at a rearward portion, above the track belt. Also, the exhaust pipe of this prior design extends in a longitudinal direction of the vehicle body between the track belt and an upper frame portion to which external components such as the fuel tank and seat are attached. A muffler is positioned downstream beside the rear end of the vehicle body. The muffler is accommodated in a rear end of the seat. In this prior design, a tail pipe is provided for discharging exhaust gas to the atmosphere. The tail pipe is provided on both lateral sides of the muffler and of the vehicle, extending rearward and upward. Additionally, the tail pipe protrudes rearward from the rear end part of the seat. As such, this conventional exhaust system discharges the snowmobile's exhaust gas rearward and upward from the rear end of the vehicle body.

SUMMARY OF THE INVENTION

The upward and rearward discharge of exhaust gas from a tail pipe, which protrudes rearward from the rear end part of the seat, in some prior snowmobiles prevents vehicle components from being mounted behind the seat. For example, a load-carrying platform cannot be mounted behind the seat due to this exhaust arrangement. Locating components in this manner is prevented because the tail pipe is positioned in a space in which such components would be disposed. More particularly, the tail pipe(s) of the above-described arrangement would physically interfere with such components.

One technique for avoiding interference between the tail pipe(s) and components which could be mounted behind the seat, is to adopt an arrangement in which the tail pipe extends below rearward vehicle external components (e.g., seat and gas tank) and the exhaust gas is discharged rearward from below rear end portions of the rearward vehicle external components. One disadvantage of this arrangement is that it can require the positions of the rearward vehicle external components to be high and thus, in a case where a load-carrying platform is to be mounted behind the seat, loading and unloading baggage to and from the load-carrying platform would become awkward. Moreover, this arrangement may cause vehicle external components mounted behind the seat to be heated and contaminated by the exhaust gas expelled from the outlet of the tail pipe, located just below the vehicle external components.

Rear discharge of exhaust gas is problematic in other circumstances as well. For example, if the snowmobile tows a sled on which a person and/or baggage is positioned, the exhaust gas impinges on the person and/or the baggage on the sled. Another problem occurs when the steering skis are deeply buried in snow. Exhaust gas can be blown into the face of a person who pushes the rear end of the vehicle to free the vehicle from the snow.

Another, option is to provide opening(s) from the tail pipe(s) that are directed to both sides of the vehicle body. However, this arrangement diffused the exhaust gas widely around the vehicle body.

Additionally, in the conventional exhaust system, since an opening in a rear end of the tail pipe is directed upward in a rear of the vehicle body, exhaust noise is unmuted.

This application describes improvements on the prior designs. One object is to enable vehicle external components, such as a load-carrying platform, to be mounted in the rear end part of the vehicle body, e.g., behind the seat, without being adversely affected by the tail pipe and the exhaust gas. This object preferably is achieved while adopting a structure in which the exhaust pipe is extended to the rear end part of the vehicle body. Another object is to prevent the exhaust gas from diffusing over a wide range. Preferably the exhaust gas is to be directed to the rear of the vehicle body. An additional object is to suppress the exhaust noise to a low level. All of these objects, however, need not be met by all embodiments of the present exhaust sytem.

In order to achieve one or more of these objects, an aspect of the present invention involves an exhaust system of a snowmobile that possesses an exhaust pipe extending above a track belt from an engine, which is mounted to a forward portion of a vehicle body. The exhaust pipe extends to a rearward portion of the vehicle body along a vehicle frame. A space is provided in the rearward portion of the vehicle body. The space is defined laterally between side walls and longitudinally by a rear wall. The space extends above the track belt, opens downward, and accommodates an opening of a tail pipe of the exhaust pipe.

In another mode, an exhaust system of a snowmobile is provided in which the space is defined in part by a rearward portion of the vehicle frame that is above an upper end portion of the track belt. The rearward portion has an opening formed therein above the track belt and cover. A lower portion of the cover can be attached to the rearward portion of the vehicle frame to cover the opening from above.

In another mode, an exhaust system of a snowmobile includes a muffler coupled with the exhaust pipe and at least partially accommodated or housed in the cover.

In another mode, an exhaust system of a snowmobile includes a tail pipe that has an upstream end, a downstream end, and an exhaust outlet. The tail pipe is arranged such that the exhaust outlet is lower than the upstream end. The tail pipe preferably also is shaped and/or mounted such that the exhaust outlet is directed toward the forward portion of the vehicle body.

In another arrangement, an exhaust system of a snowmobile includes a guard plate provided in the rearward portion of the vehicle frame. The guard plate preferably covers a lower portion of the tail pipe from behind and/or below.

In another arrangement, an exhaust system includes a load-carrying means, e.g., a sled or a load-carrying platform, provided behind or in a rear of the space.

One of the advantages of the snowmobile and exhaust system arrangements described and claimed herein is that exhaust gas is discharged above the track belt in the space defined in the rearward portion of the vehicle body. A snowmobile equipped with the exhaust systems described herein can have components located behind components of the rearward portion of the snowmobile, e.g., the seat. Such components are not impacted by or interfered with by the tail pipe or exhaust therefrom, e.g., are not heated or contaminated by exhaust gas.

Also, in the exhaust systems described herein, the exhaust gas is discharged between the exhaust pipe and the track belt in the rearward portion of the vehicle body. As such, it is possible to prevent exhaust gas from being directed onto a person riding on or baggage mounted to a load-carrying means (e.g., a rack) or other vehicle component.

Additionally, according to the exhaust system and the snowmobiles designs described herein, if a person is standing or working behind the snowmobile, such as when the skis have been deeply buried in the snow and the person is attempting to free the snowmobile, exhaust gas is substantially prevented from being exhausted directly onto the person.

In addition, the exhaust systems and snowmobiles described herein discharge the exhaust gas in the space defined in the snowmobile rear portion and thus the exhaust gas is not diffused over a wide range. Also, by discharging the exhaust gas in the space, the exhaust noise can be reduced or attenuated.

Also, the exhaust systems and snowmobiles described herein can include a vehicle frame formed by a press. The vehicle frame can be formed with a box-like construction, e.g., including a cover or a box-like cover. In some cases, the cover is made in a molding process from a synthetic resin. A molding process can be used such that the cover can have a relatively complicated shape. Other techniques can be used to form these components and the space defined therein, which opens downwardly in some arrangements.

In some cases, a muffler of a large volume can be used while maintaining a relatively wide clearance between the muffler and the track belt.

In some applications, the exhaust system or snowmobile can be arranged to discharge exhaust gas is a selected direction, e.g., toward a front of the vehicle or in the direction of movement of the track belt adjacent to the exhaust discharge. In some cases, the exhaust gas discharged from the exhaust systems described herein can be directed toward the front of the vehicle body by the rotating track belt. In some cases, the exhaust gas discharged from the exhaust systems described herein can be discharged laterally of the vehicle body while being directed toward the front of the vehicle body by the rotating track belt.

In the exhaust system and snowmobile arrangements described herein, the exhaust gas does not remain in the space defined in the rearward portion of the vehicle body. Accordingly, the exhaust gas does not greatly increase the temperature of the components of the snowmobile, e.g., the walls of the vehicle frame. Under some operating conditions, snow sprayed up by the track belt adheres to the walls. As the temperature of the walls increases, the snow becomes stickier and is more likely to adhere to the walls. Sticky snow is more likely to adhere and accumulate in and around the track belt. Accumulation of snow is disadvantageous in that it increases the weight of the snowmobile and can interfere with the movement of the track belt. The arrangement described herein reduces the likelihood of elevated temperatures in and around the exhaust system and thus reduces these problems.

According to the exhaust system and the snowmobile described herein, the temperatures of the walls defining the space, in which the tail pipe extends, are not greatly increased by the exhaust system. Thus, conditions in which snow is likely to accumulate around the track belt are less likely.

Also, exhaust efficiency is improved in the exhaust systems and snowmobiles described herein because the exhaust gas is directed toward a forward portion of the snowmobile, e.g., by the movement of the track belt.

In some arrangements, interference between the track belt and the tail pipe is prevented by one or more guard plates. These arrangements protect the tail pipe, while allowing the tail pipe to be positioned near an upper part of the track belt.

In other arrangements, a load-carrying platform is provided toward the rear of the snowmobile. The load-carrying platform is not heated by the heat of the exhaust gas. In some arrangements, the load-carrying platform is not contaminated by the exhaust gas.

In one aspect, an exhaust system for a snowmobile is provided. The snowmobile includes a forward portion in which an engine is mounted, a rearward portion, and a track belt for propelling the snowmobile. The exhaust system has an exhaust pipe that extends above the track belt from the engine to the rearward portion of the snowmobile. The exhaust pipe includes a tail pipe having an outlet to the atmosphere. The rearward portion of the snowmobile includes a space defined between a first lateral wall, a second lateral wall, and a rear wall. The space has an opening that faces the track belt. The tail pipe is located in the space.

In another aspect, a snowmobile is provided. The snowmobile includes a frame having a forward portion and a rearward portion, an engine, a track belt, and an exhaust pipe. The engine is mounted in the forward portion of the frame. The track belt is for propelling the snowmobile. The track belt is coupled with the rearward portion of the frame. The exhaust pipe extends above the track belt and behind the engine. The exhaust pipe includes a rear portion having an outlet to the atmosphere. The snowmobile also includes a cavity at least partially defined by the frame. The cavity comprises a rear wall and an opening that faces the track belt. The rear portion of the exhaust pipe extends through the cavity and the outlet is forward of the rear wall.

In another aspect, a snowmobile is provided that comprises a frame, an engine mounted in a forward portion of the frame, a track belt, and an exhaust pipe. The track belt is for propelling the snowmobile and is coupled with the frame. The exhaust pipe extends above the track belt and behind the engine. The exhaust pipe includes a rear portion that has an outlet to the atmosphere. The snowmobile also includes means for carrying a load behind the snowmobile and means for preventing exhaust gas from the exhaust pipe from impinging upon the load-carrying means.

In another aspect, an exhaust system for a snowmobile is provided. The snowmobile comprises an engine, a track belt for propelling the snowmobile, and a seat upon which an operator can sit. The exhaust system comprises an exhaust pipe extending rearward from the engine under the seat. The exhaust pipe is configured to discharge exhaust gas onto the track belt.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENT

Embodiments of the present invention will be hereinafter described in connection with the attached drawings.

Figure 1:
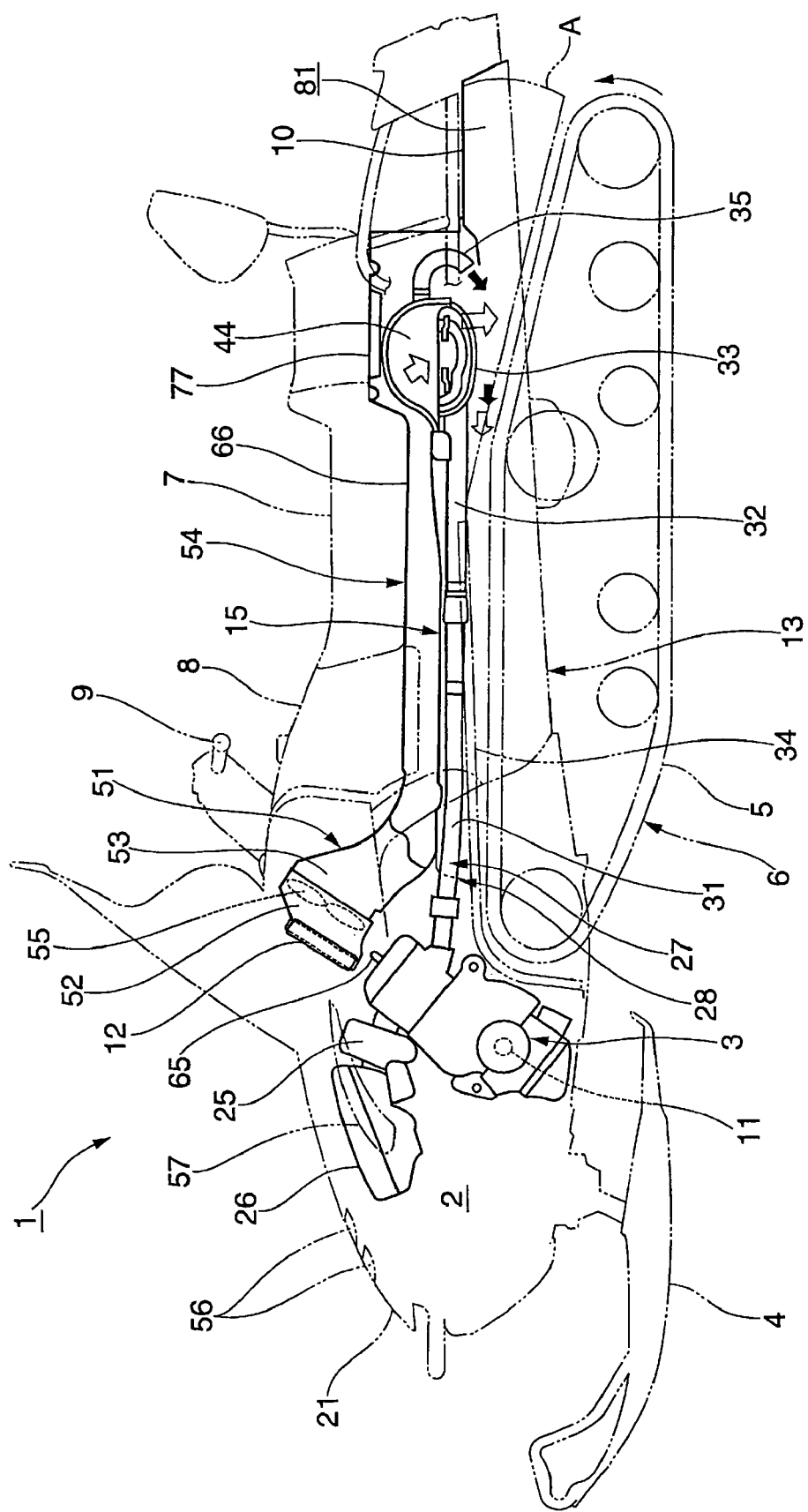
FIG. 1 is a side view showing one embodiment of a snowmobile equipped with one embodiment of an exhaust system.
Figure 2:
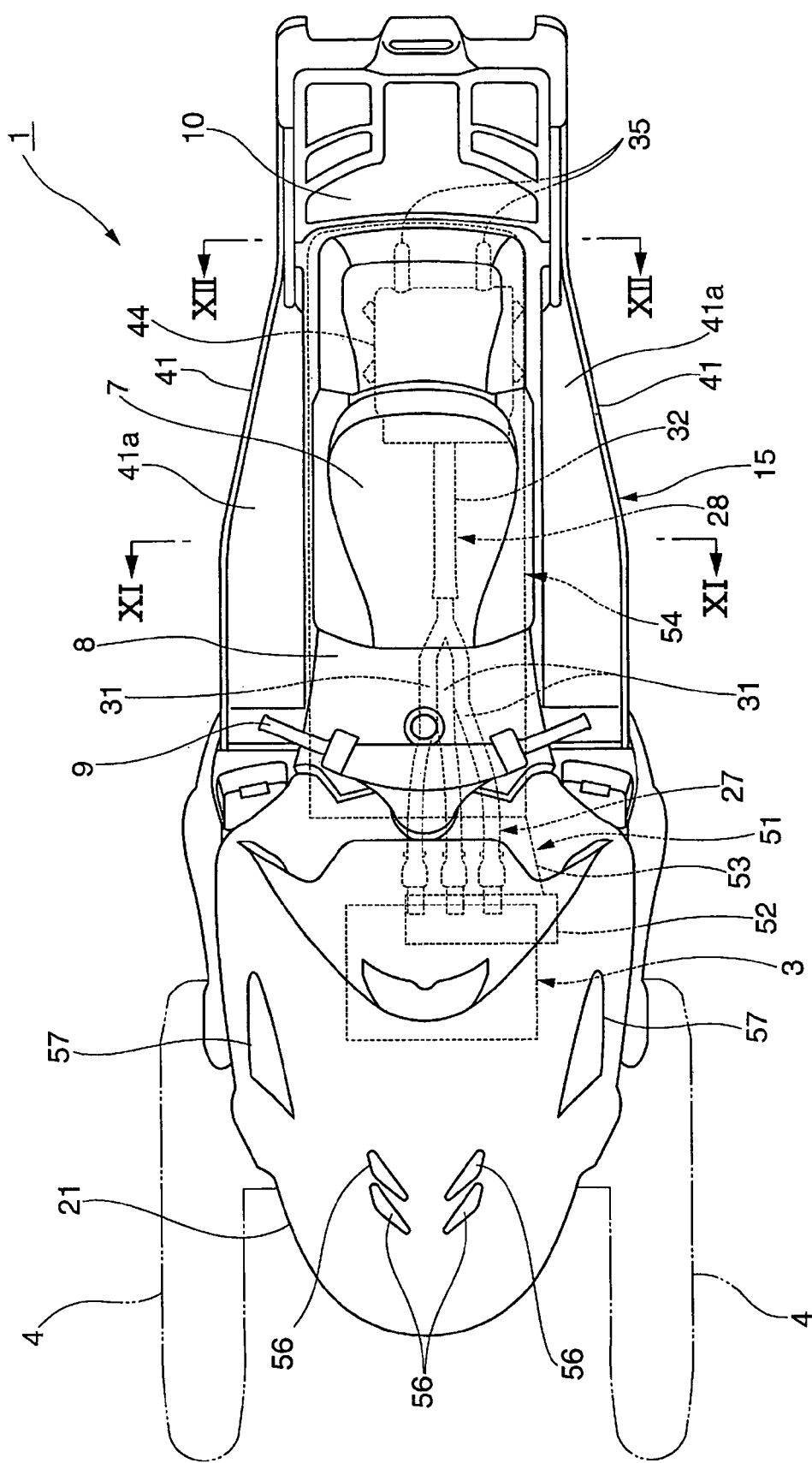
FIG. 2 a top plan view of the snowmobile and the exhaust system of FIG. 1.

With reference to FIGS. 1 and 2, one embodiment of a snowmobile 1 that has an engine 3 mounted in an engine compartment 2 located in a forward portion of a vehicle body. The snowmobile 1 is steered by a pair of left and right steering skis 4, 4 and is propelled by a track belt 5 that is rotated by the engine 3. The track belt 5 is coupled with a driven unit 6 that can be located near a laterally central portion of the vehicle. The driven unit 6 is propelled by a transfer of power from the engine 3 via a drive mechanism or transmission not shown in the drawing.

The snowmobile 1 includes a vehicle body upper portion. Among the components that can be mounted to the vehicle body upper portion are a seat 7 on which a passenger or crew (not shown in the drawing) sits while operating the vehicle, a fuel tank 8, and a steering handle 9 that the crew grips.

Figure 11:
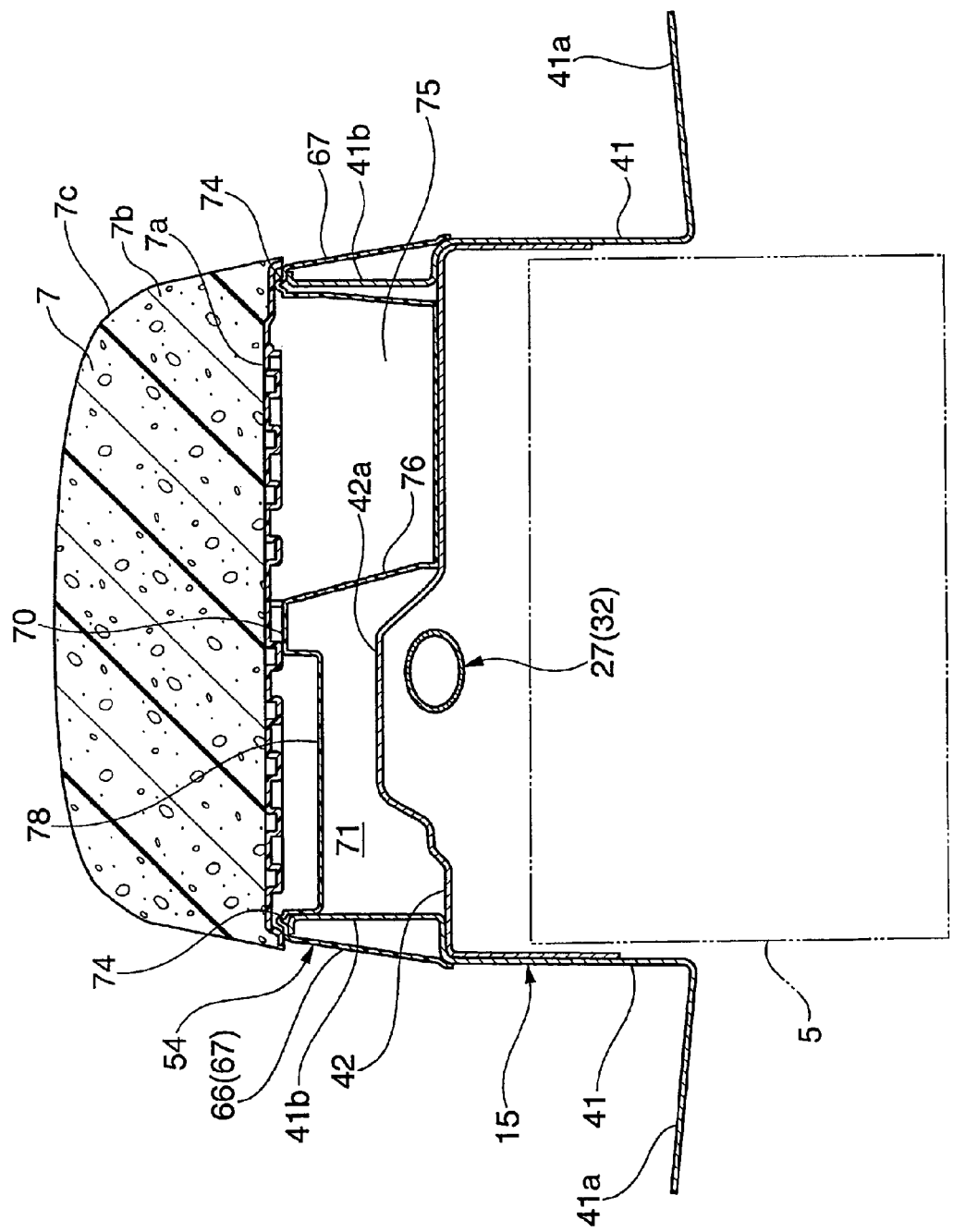
FIG. 11 is cross-section view of a vehicle body upper portion, the cross-section being taken at section plane 11-11 shown in FIG. 2.
Figure 12:
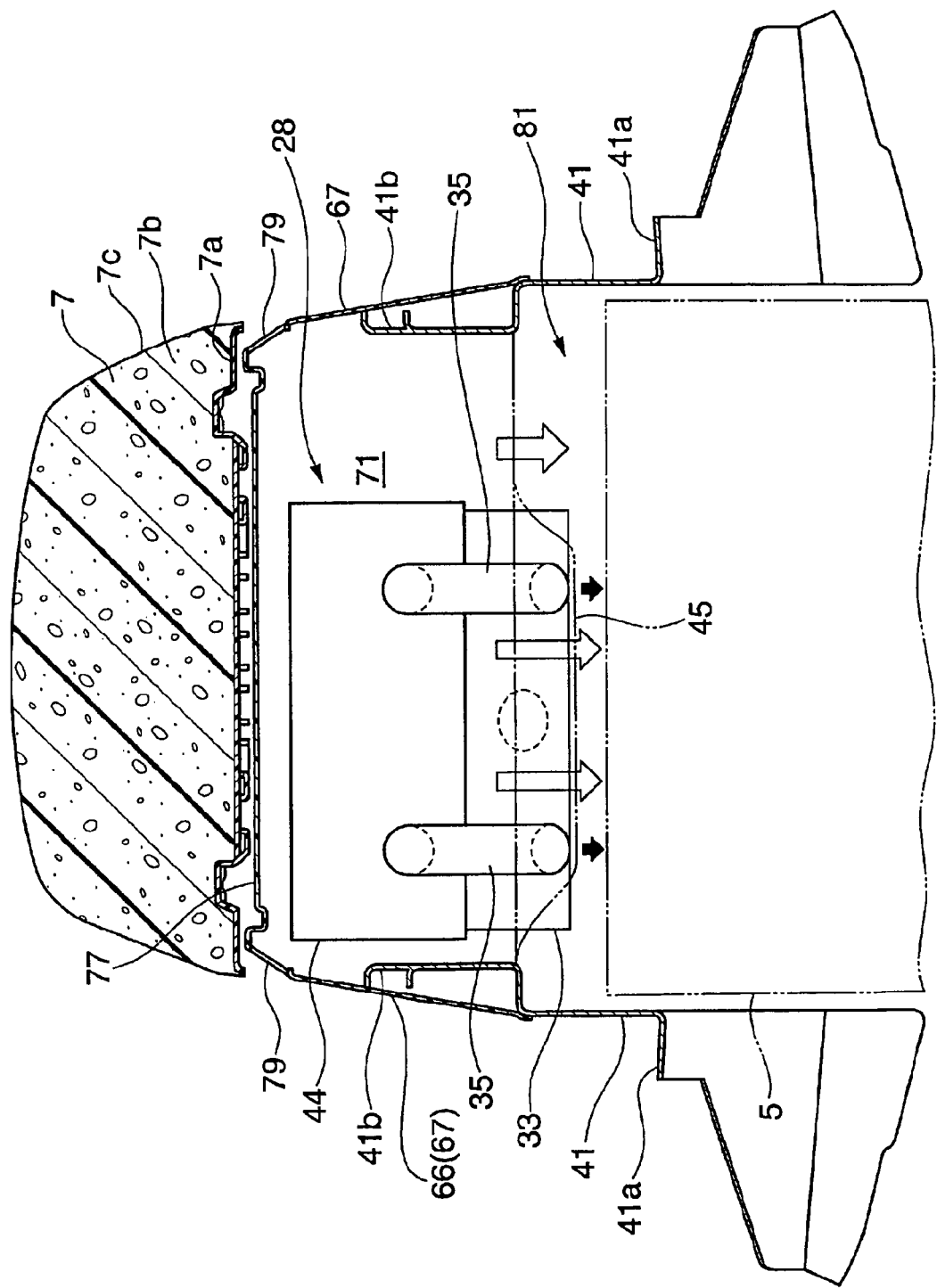
FIG. 12 is cross-section view of a vehicle body upper portion, the cross-section being taken at section plane 12-12 shown in FIG. 2.

FIGS. 11 and 12 show that the seat 7 can include a bottom plate 7a, cushion material 7b, and a skin 7c or similar structure to cover a surface of this cushion material 7b. The bottom plate 7a can be made of a synthetic resin. The fuel tank 8 also can be made of a synthetic resin. The fuel tank 8 can be molded to a predetermined shape, e.g., by a blow molding process or the like. The seat 7 and the fuel tank 8 are examples of vehicle components and are sometimes referred to herein as external vehicle components because they form a portion of the external surface of the snowmobile 1. The steering handle 9 can be connected to the left and right steering skis 4, 4 by a conventional steering linkage. In one embodiment, the snowmobile 1 includes a load-carrying platform 10 positioned behind the rear of the seat 7.

In one embodiment of the snowmobile 1, the engine 3 is a water-cooled 4-cycle 3-cylinder engine. FIGS. 1 and 2 show that the engine 3 can be mounted to a lower portion of the engine compartment 2. The engine 3 can be mounted such that a longitudinal axis of a crank shaft 11 of the engine 3 is arranged substantially perpendicular to the longitudinal axis of the snowmobile, e.g., the engine can be transversely mounted in the engine compartment 2, a radiator 12 can be disposed in an upper portion of the engine compartment 2 and above the engine 3, as discussed further below.

The engine 3 can be supported by a frame member, not shown in the drawings, that at least partially defines the engine compartment 2. The frame member can be formed in a shape enclosing, shielding, or substantially surrounding the engine 3 from below, the rear, and at least one lateral side. In one embodiment, the frame member that at least partly defines the engine compartment 2 can constitute one portion of a vehicle body frame 13 (shown in FIG. 1) of the snowmobile 1. This vehicle body frame 13 includes a forward frame portion 14 (refer to FIG. 5) including the frame member at least partly defining the engine compartment 2, and a rearward frame portion 15 (refer to FIG. 7). The rearward frame portion 15 can be connected to a rear end part of the front frame portion 14.

Figure 5:
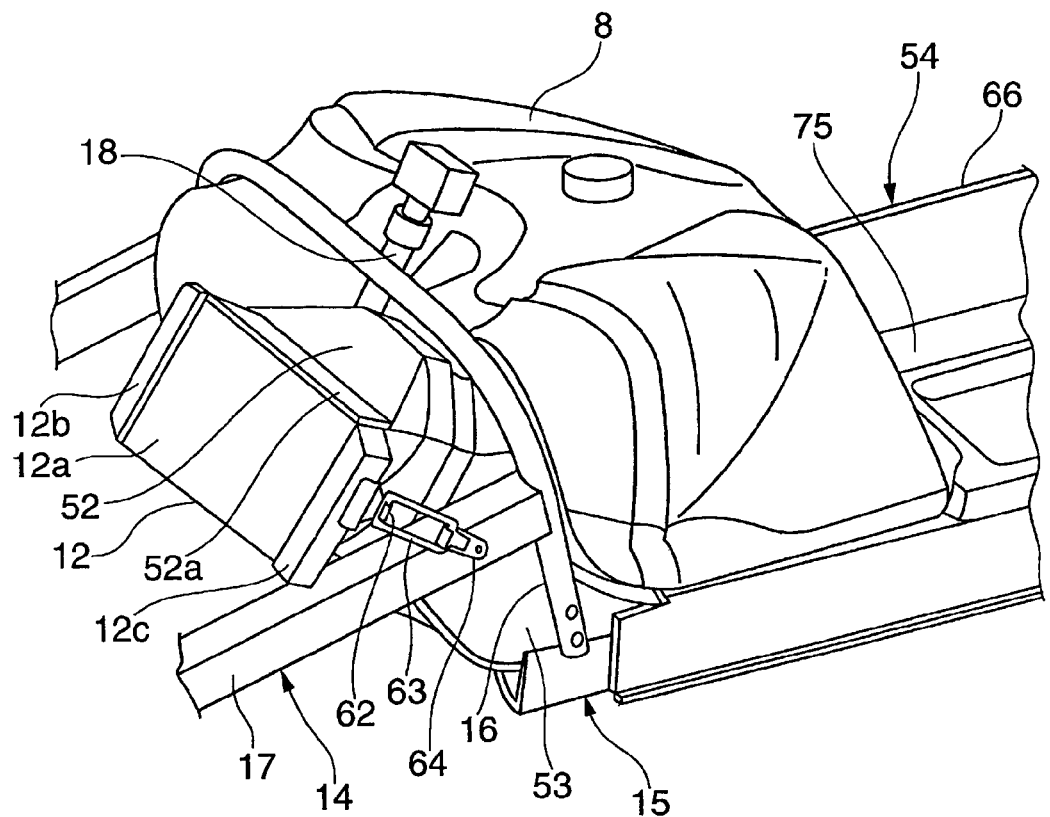
FIG. 5 a perspective view showing a fuel tank mounted to a vehicle frame.

FIG. 5 shows that the front frame portion 14 can include a cross member 16 that in one embodiment includes a pipe that is connected to a front end of the rearward frame portion 15. The cross member 16 extends upwardly above the front end of the rearward frame portion 15. The front frame portion 14 also can include a front frame portion main body 17 that extends forwardly and that slants downwardly toward the front of the snowmobile 1. The front frame portion main body 17 can extend downwardly from about half-way up the cross member 16. The front frame portion main body 17 can extend from the frame member that at least partially defines the engine compartment 2, discussed above, which frame member extends forward from the front end part of the rear frame portion 15. Although not shown in the drawings, the front frame portion main body 17 can be configured as a U-shaped member that is open toward the rear of the vehicle body in a top plan view. In one construction, the rear end portions of the U-shaped front frame portion main body 17 are welded to the cross member 16 on lateral sides of the snowmobile 1.

FIG. 5 shows that a support 18 can be provided at a laterally central portion of the cross member 16. The support 18 can be located on or near a vertical longitudinal central plane of the snowmobile 1 and can enable rotation of a steering shaft (not shown in FIG. 5) of the steering handle 9. The support 18 can be configured as a pipe. FIG. 5 also shows that a forward portion of the fuel tank 8 can be located near a rearward portion of the cross member 16.

Figure 3:
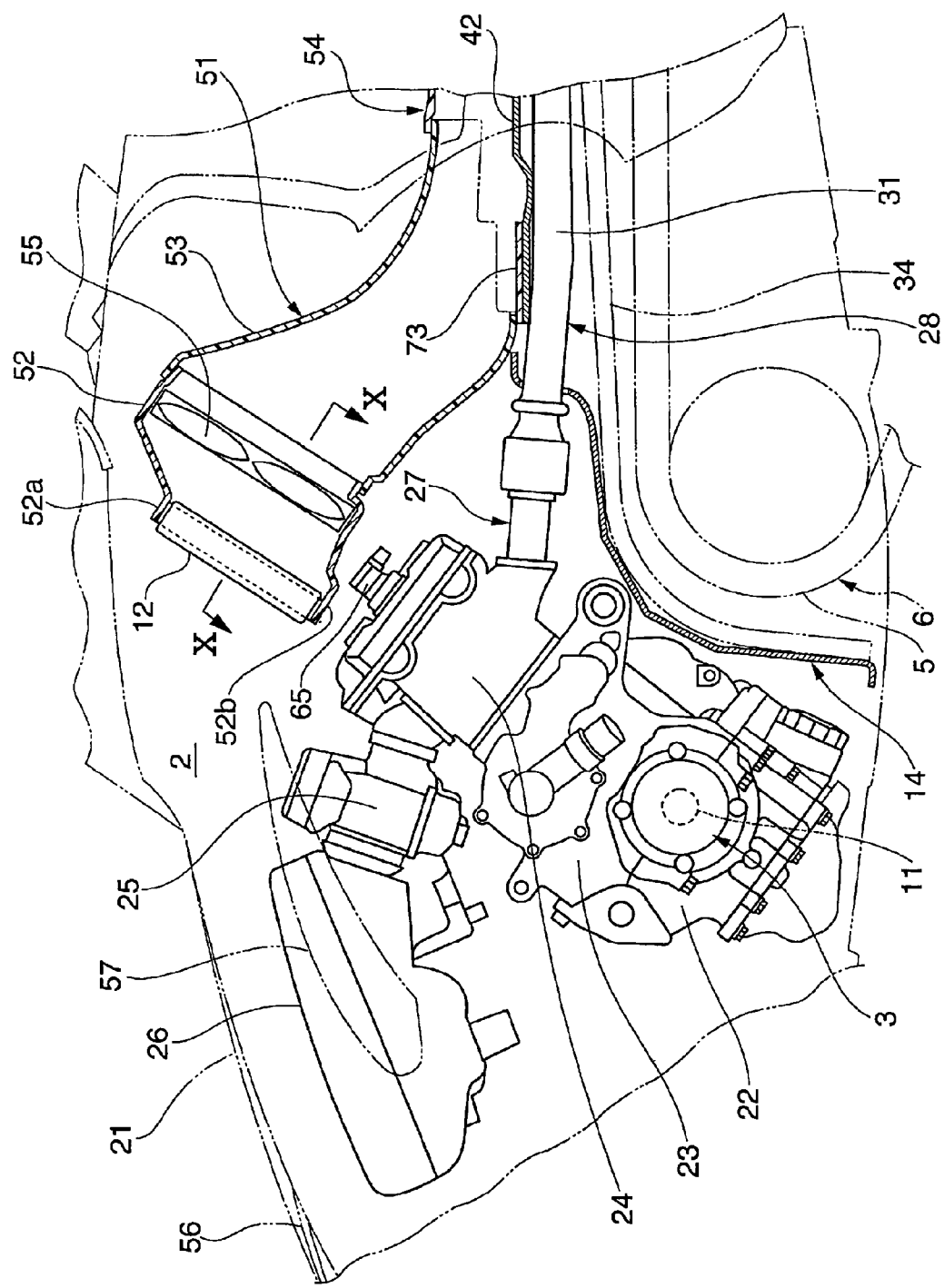
FIG. 3 an enlarged side view showing a portion of an engine compartment in partial cross-section.

FIGS. 1-3 shows that the engine compartment 2 of the snowmobile 1 can be defined at least in part by the frame member* of the front frame portion 14, a front face of the fuel tank 8, and a vehicle body cover 21. The vehicle body cover 21 covers a front part of the vehicle body.

With reference to FIG. 3, the engine 3 includes a crank case 22 and a cylinder body 23 and rotatably supports the crank shaft 11. In one embodiment, a carburetor 25 is connected to a forward facing side of a cylinder head 24 of the engine 3 and an air cleaner 26 is connected to and located upstream of the carburetor 25. In one embodiment, a carburetor 25 is provided for each cylinder, drawing air from a common air cleaner 26. In another embodiment, one carburetor 25 is provided for all cylinders, drawing air from a common air cleaner 26. An exhaust system 28 is provided that has an exhaust pipe 27 connected to a rear-facing side of the cylinder head 24. The exhaust pipe 27 is discussed in greater detail below.

Figure 4:
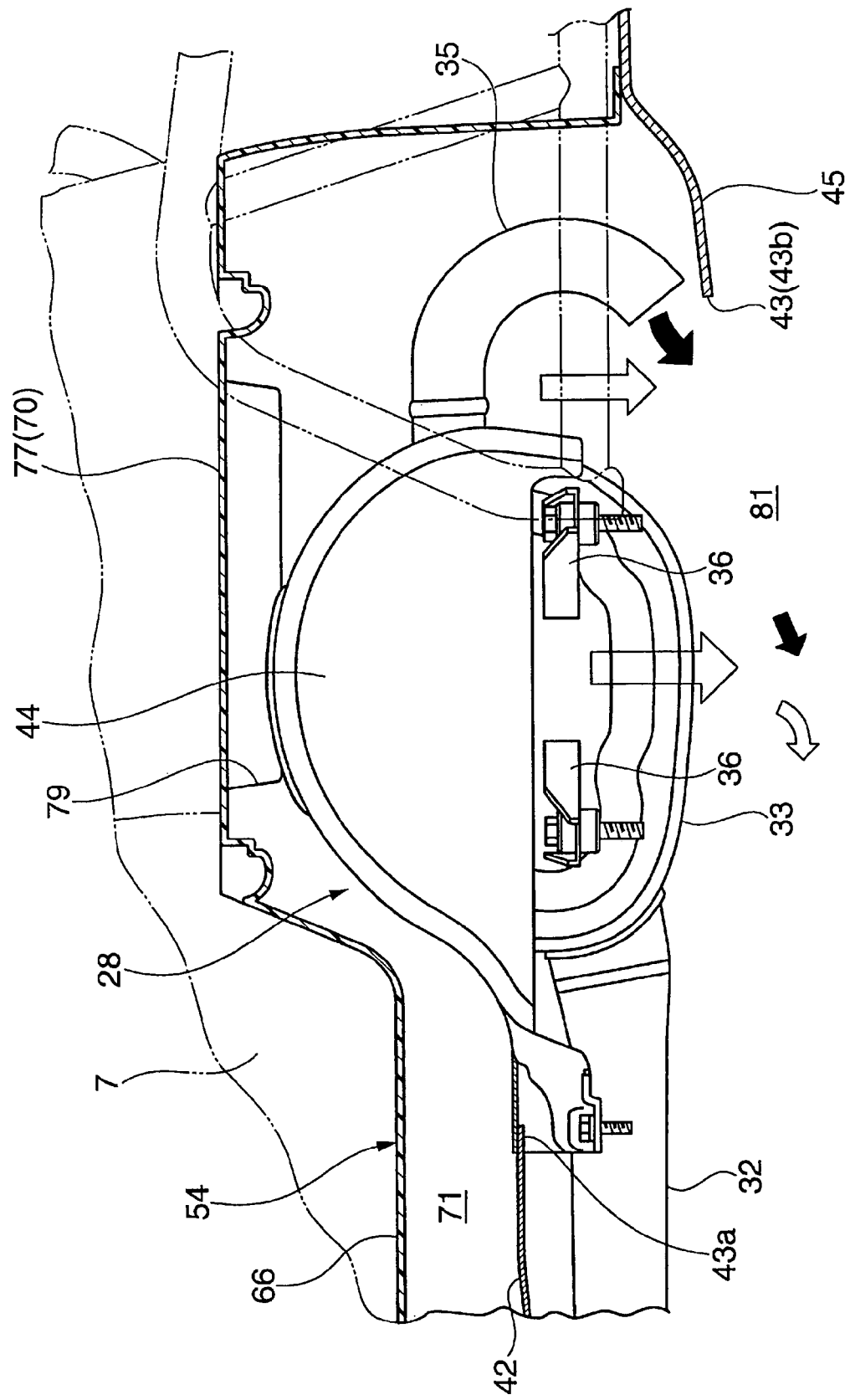
FIG. 4 an enlarged side view showing a rearward portion of a vehicle body in partial cross-section.

With reference to FIGS. 1 and 2, the exhaust pipe 27 has a forward branch 31 for every cylinder of the engine 3. The forward branch 31 extends in an approximately horizontal direction above the track belt 5 from the engine 3 toward the rear of the vehicle body. Rearward portions of the forward branches 31 merge into a merged or collected pipe 32 below the seat 7 in one embodiment. A merged or collected pipe 32 is a common pipe and that extends approximately horizontally toward the rear of the vehicle body in one embodiment. The merged pipe 32 is coupled with or is connected to a muffler 33. FIG. 4 shows the merged pipe 32 connected to the muffler 33 at a location in the rearward portion of the vehicle body. FIG. 2 shows that in one embodiment, the exhaust pipe 27 is disposed in a position that is offset from the longitudinal center (e.g., a vertical longitudinal central plane) of the vehicle body, e.g., toward the left side of the vehicle body. The exhaust pipe 27 can be offset toward the right side of the vehicle body in other embodiments.

FIGS. 1 and 3 show a heat sink 34 that is provided between the forward branches 31 and the track belt 5. The heat sink is configured to cool the coolant used to cool the engine 3. The heat sink 34 has a shape similar to the shape of the track belt 5, e.g., having a forward curved portion and a straight upper portion. The heat sink 34 is attached to a rear-facing side of the forward frame portion 14 in one embodiment. The heat sink 34 has a coolant passage though which the coolant flows. The heat sink 34 extends rearward along an upper face of the track belt 5 from adjacent to the rear of the engine 3 to a location adjacent to a lower portion of the seat 7.

In one embodiment, the muffler 33 is a multistage expansion muffler. The muffler 33 is configured to discharge an exhaust gas from a pair of tail pipes 35 that protrude from a rear end thereof. This tail pipes 35 preferably are bent such that a discharge port thereof is directed toward a front lower portion of the snowmobile 1, e.g., slantingly directed toward a front lower portion of the snowmobile 1. FIG. 1 shows that in one embodiment, the exhaust gas is discharged from the tail pipe 35 toward the track belt 5.

Figure 7:
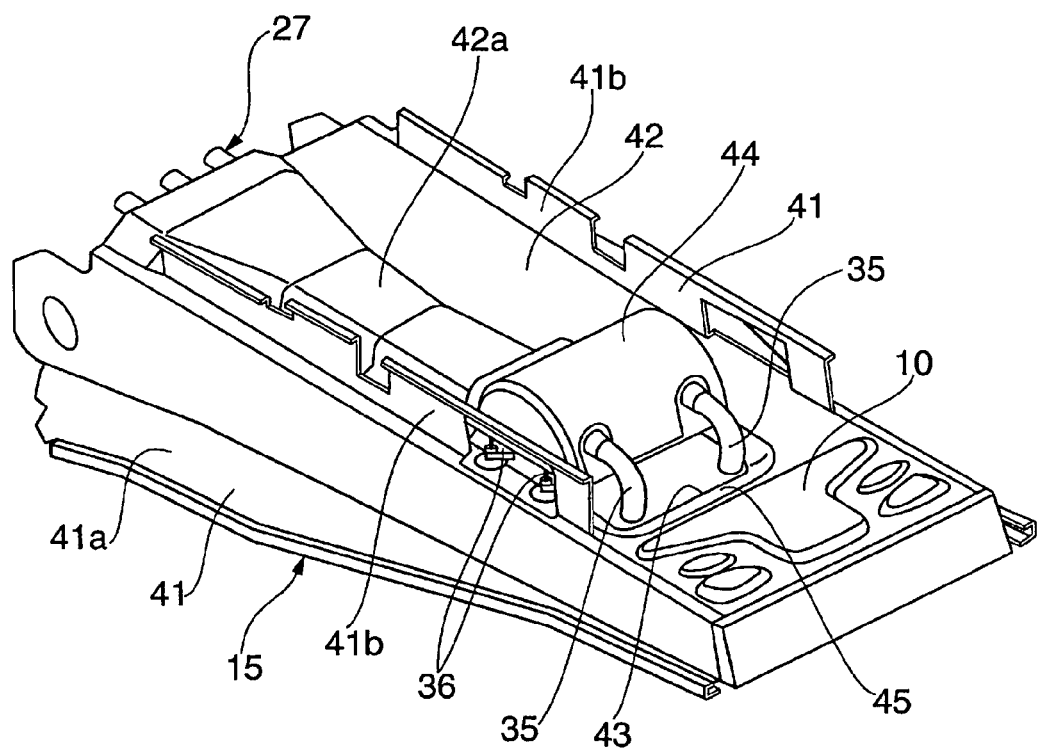
FIG. 7 is a perspective view of a rearward portion of a vehicle frame to which an exhaust pipe and a muffler can be mounted.

With reference to FIGS. 4 and 7, the muffler 33 includes attaching brackets 36 by which the muffler is attached to the rearward frame portion 15. The attaching brackets 36 can be located at forward and rearward end portions of the muffler 33. In one embodiment, the attaching brackets 36 protrude from the muffler 33.

With reference to FIGS. 7, 11, and 12, the rearward frame portion 15 includes a pair of side frame portion 41. The side frame portions 41 are located on both lateral sides of the vehicle. An upper frame portion 42 extends above the track belt 5 and connects upper portion of the side frame portions 41. The upper frame portion 42 is formed in a shape to cover an upper portion of the track belt 5 from above. The side frame portions 41 preferably are located laterally outside of the track belt 5. FIG. 1 shows that in one arrangement, a lower portion of the side frame portion 41 is formed to overlap with or to cover at least a portion of the track belt 5 as viewed from the side.

The exhaust pipe 27 is disposed between the upper frame portion 42 and the track belt 5. The side frame portion 41 and the upper frame portion 42 can be formed by forming a plate member of a suitable material, such as aluminum alloy, to a predetermined shape. One technique for forming the frame portions is by press working and the like.

With reference to FIGS. 11 and 12, a step 41a on which the crew puts his/her foot can be formed to extend outward from a lower end portion of the side frame portion 41. The side frame portion 41 also can include a longitudinal plate 41b for mounting at least one vehicle component, such as at least one of the seat 7 and the fuel tank 8. The longitudinal plate 41b can be located in an upper portion of the side frame portion 41. The longitudinal plate 41b can be formed monolithically with the side frame portion 41 and can extend in a forward and rearward direction of the vehicle body.

FIGS. 7 and 11 show that in one embodiment, the upper frame portion 42 includes an elevated portion 42a that is configured to accommodate the exhaust pipe 27. The elevated portion can be located on one side part in the vehicle body, e.g., on the left side of the upper frame portion 42. Further, FIGS. 4 and 7 show that the upper frame portion 42 can include an opening 43 through which at least one of the muffler 33 and the tail pipe(s) 35 can be inserted. In one embodiment, the load-carrying platform 10 is formed as a region of the upper frame portion 42, e.g., is monolithically formed. In some arrangements, the opening 43 includes a forward portion 43a and a rearward portion 43b. An upper guard 44 can be provided to cover the muffler 33 from above. The upper guard 44 can be attached to snowmobile 1 adjacent to the forward portion 43a of the opening 43. FIG. 4 shows that in some embodiments, a guard plate 45 can be mounted adjacent to the rearward portion 43b of the opening 43. In one embodiment, the guard plate 45 is formed as a region of a structural member of the snowmobile 1, e.g., as a region of the upper frame portion 42. The guard plate 45 can be monolithically formed as a portion of a frame member. The guard plate 45 preferably extends to a vicinity of a lower portion of the tail pipe 35, e.g., from behind and/or below.

FIGS. 1 and 3 show that the snowmobile can include a duct 51 that can support the radiator 12, which can be disposed above the engine 3. The duct 51 can be located toward the rear of an upper part of the engine compartment 2. The duct 51 conveys the air that has cooled the radiator 12 to a location outside of the engine compartment 2. The duct 51 can be located on a rear side of an electrically driven fan 55 located near the radiator 12.

Figure 8:
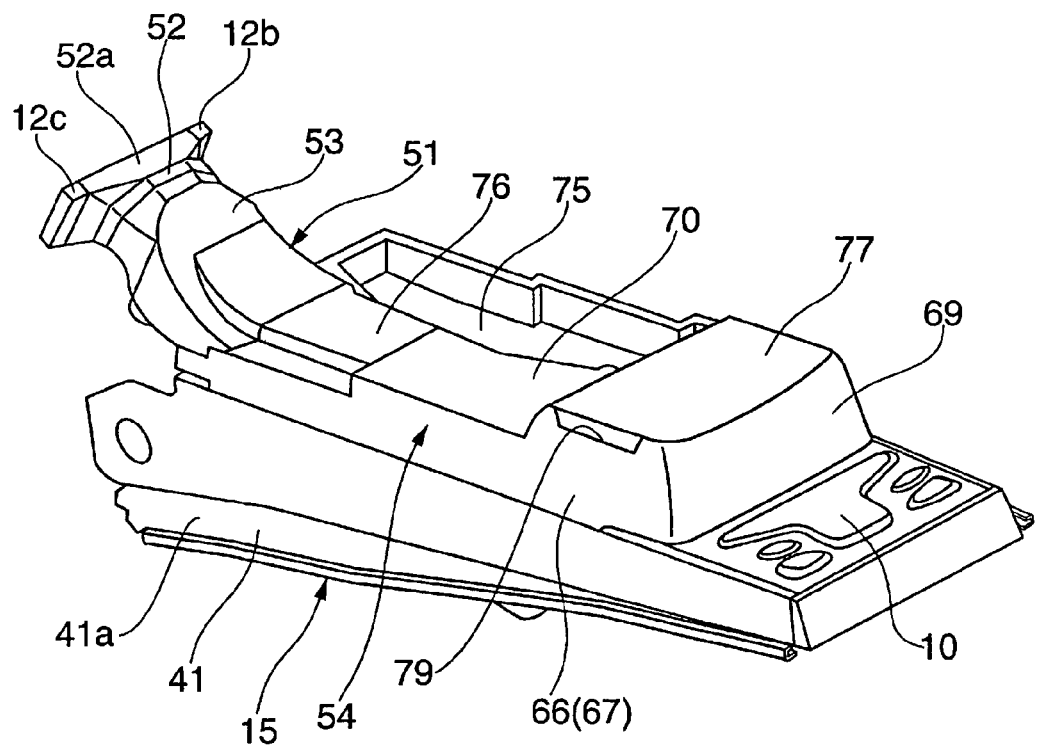
FIG. 8 a perspective view showing a duct main body attached to the rearward portion of the vehicle frame.

With reference to FIGS. 1, 3, and 8, this duct 51 includes in one embodiment a first duct portion 52 to which the radiator 12 is mounted and a second duct portion 53 that can support the first duct portion 52. The second duct portion 53 can be located in the engine compartment 2 behind the first duct portion 52. The duct 51 preferably also includes a third duct portion 54 that extends rearward from the engine compartment 2.

In one arrangement, the first duct portion 52 is formed like a polygon, e.g., like a rectangle, in cross-section. The first duct portion 52 can be made of any suitable material and by any suitable process, for example by molding a synthetic resin material. The radiator 12 can be fixed to the front of the first duct portion 52. The fan 55 can be electrically driven and preferably is attached to the rear of the first duct portion 52. The fan 55 draws air from within the engine compartment 2 through the radiator 12 and directs the air rearward within the duct 51. The air in the engine compartment 2 is drawn into the engine compartment 2 as the snowmobile 1 is moving, e.g., through vents in an external surface of the snowmobile and into the engine compartment 2.

More particularly, airflow can be drawn into the engine compartment 2 through outside air intake ports 56, 57 (refer to FIGS. 1 and 2) that are formed on a front face of the vehicle body cover 21. The outside air intake ports 56, 57 preferably are formed in places on the front face of the vehicle body cover 21 spaced from the radiator 12 so that snow entering the engine compartment 2 therethrough does not adhere to the radiator 12.

In one arrangement, the radiator 12 is positioned at a central portion of the snowmobile 1, e.g., bisected by or near a central vertical longitudinal plane of the snowmobile 1. The radiator 12 preferably is positioned near an upper portion of the engine compartment 2. The outside air intake port 56 can be formed at a central portion of the snowmobile 1, e.g., bisected by or near a central vertical longitudinal plane of the snowmobile, but preferably at a position that is lower than that of the radiator 12. The outside air intake ports 57 can be formed on one or both lateral sides of the snowmobile 1 at positions that are lower than that of the radiator 12.

In one arrangement of the snowmobile 1, the air cleaner 26 is positioned between the outside air intake port 56 and the radiator 12, whereby the air cleaner 26 can intercept snow that flows into the engine compartment 2 from the outside air intake port 56.

Figure 6:
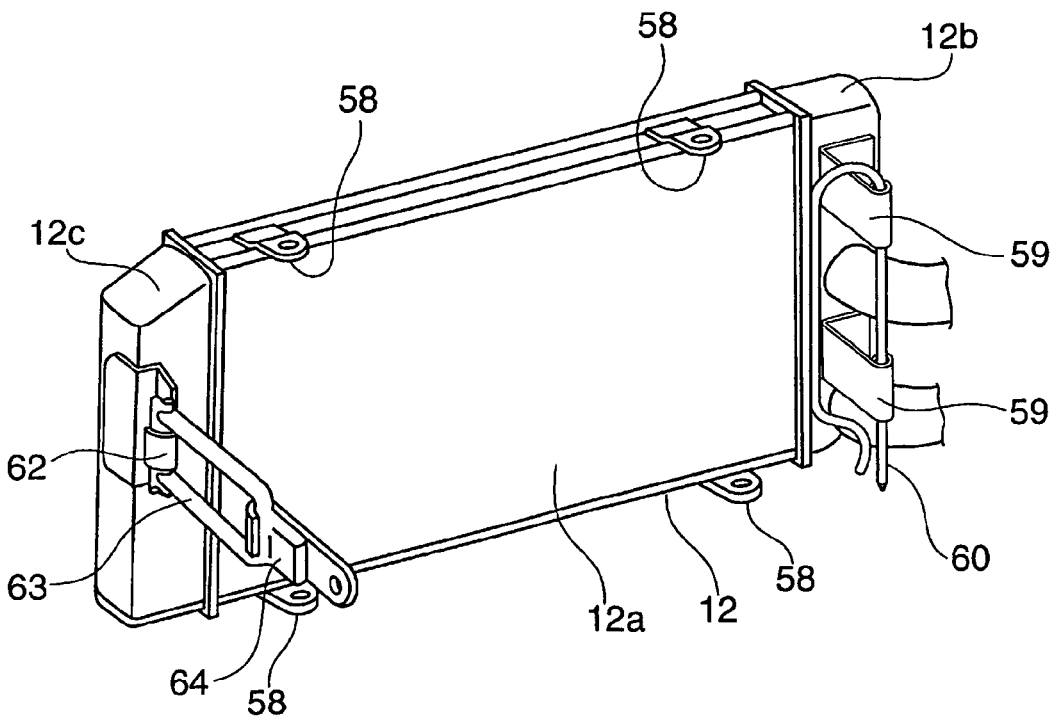
FIG. 6 a top perspective view showing a rearward portion of a radiator illustrating a portion that mount to the vehicle body.

With reference to FIG. 6, the radiator includes a core portion 12a and coolant tanks 12b, 12c. An opening at a front end of the first duct portion 52 is configured to facilitate airflow through the core portion 12a, e.g., by having the same size and shape as the core portion 12a. The coolant tanks 12b, 12c can be located on sides that are lateral of the central vertical plane of the snowmobile 1 if the radiator 12 is transversely mounted. More particularly, in one embodiment, the coolant tanks 12b, 12c extend laterally of the first duct portion 52 in one arrangement.

Figure 10:
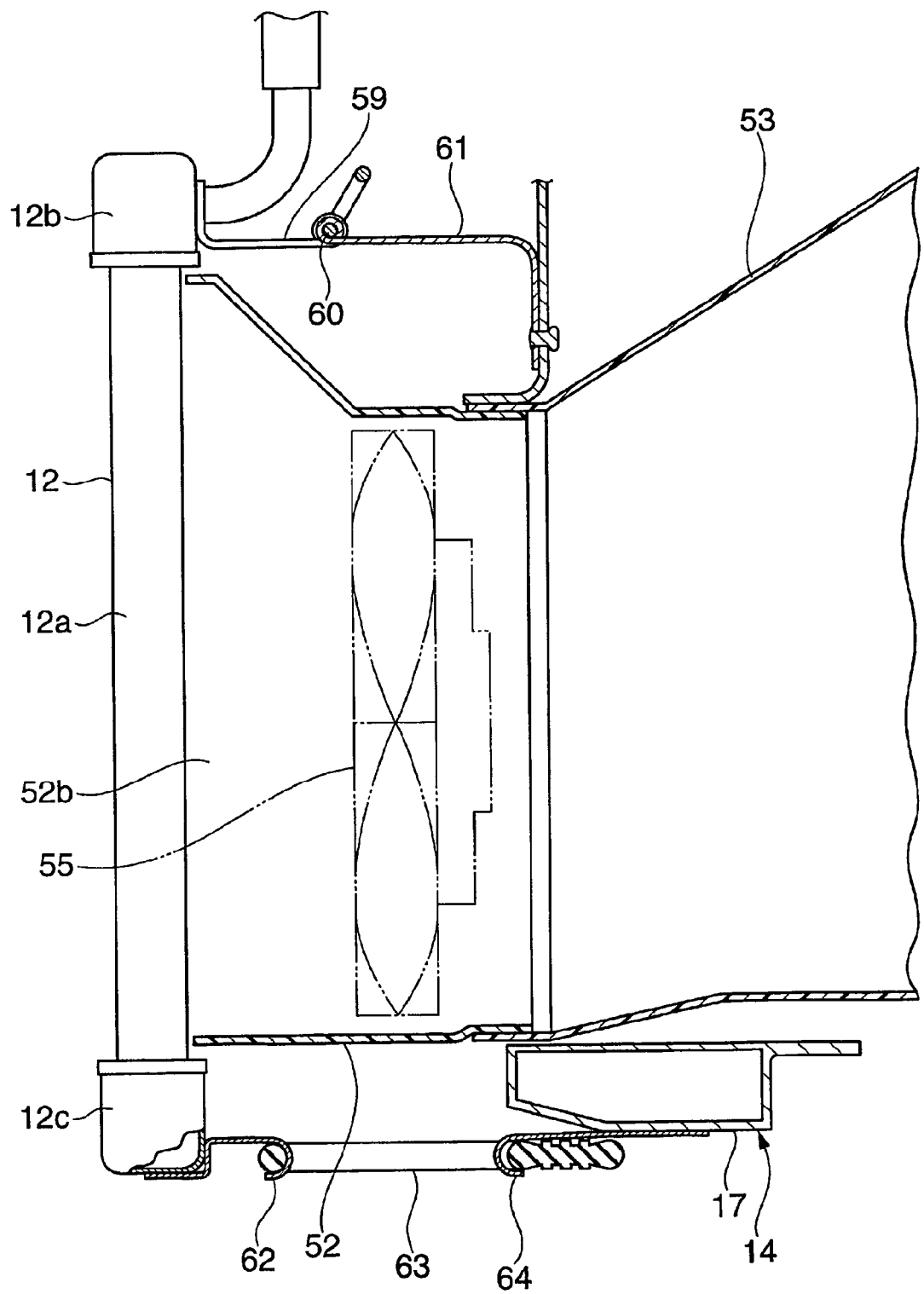
FIG. 10 an enlarged cross-section view showing a forward portion of a duct, the cross-section being taken at section plane 10-10 shown in FIG. 3.

The radiator 12 can be coupled with the first duct portion 52 in any suitable manner, for example by brackets 58. FIG. 6 shows that the brackets 58 can be provided around the core portion 12a, e.g., protruding from upper and lower ends of the core portion 12a of the radiator 12. The brackets 58 can be configured to couple with an upper wall 52a of the first duct portion 52, as shown in FIGS. 5 and 8, and with a lower wall 52b of the first duct portion 52, as shown in FIG. 10. In one arrangement, bolts are used to couple the brackets 58 with the first duct portion 52.

FIGS. 6 and 10 show that in some embodiments the radiator 12 can include supporting stays 59 that extend rearward. For example supporting stays 59 can be welded or otherwise affixed on the right-hand side of the radiator, e.g., to the coolant tank 12b. In one arrangement, the radiator 12 is rotatably supported by a supporting bracket 61, shown in FIG. 10, by a pin 60 that can be detachably connected to the stays 59. The pin 60 extends vertically through the stays 59 and the supporting bracket 61. The stays 59 can pivot relative to the bracket 61 about the pin 60.

The supporting bracket 61 can be supported by a supporting plate (not shown in the drawing) that extends downward from the cross member 16 of the front frame portion 14. Further support for the radiator 12 can be provided on the left-hand side thereof. For example, the coolant tank 12c of the radiator 12 can include a hook 62 or other coupling device coupled therewith. For example, the hook 62 can be welded to the coolant tank 12c. In one arrangement, an elastic member 63 extends rearward of the hook 62 and is coupled under tension with the front frame portion 14. The tension in the elastic member 63 urges the radiator 12 rearward. FIG. 5 shows that a rear end part of the elastic member 63 can be coupled with a hook 64 that is coupled with a rearward portion of the front frame portion main body 17 on the left side of the vehicle body.

By this arrangement, the radiator 12 and the first duct portion 52 can be rotated transversely with the pin 60 as the center of rotation by detaching the elastic member 63 from at least one of the hooks 62, 64. By positioning spark plugs 65 of the engine 3 below the radiator 12, such rotation is provided. See FIGS. 1 and 3.

One advantage of this arrangement is that by rotating the radiator 12 and the first duct portion 52 from a normal position above the engine 3 to the vehicle body right side, a portion above the engine 3 is widely exposed. This facilitates servicing of components in the engine compartment 2, e.g., an attachment or detachment of the spark plugs 65, servicing the radiator 12 or fan 55, etc. The elastic member 63 comprises one detachable locking means, as discussed elsewhere herein.

In one arrangement, the second duct portion 53 comprises a polygon, e.g., a rectangle, in cross-section. The second duct portion 53 can be formed of any suitable material and by any suitable technique, e.g., by molding a synthetic resin material. The second duct portion 53 preferably is fixed to a front end of the third duct portion 54. Preferably the second duct portion 53 slants forwardly, upwardly and faces into a rearward portion of the engine compartment 2. Preferably the forward portion of the second duct portion 53 is formed such that a rearward portion of the first duct portion 52 can detachably connected to the second duct portion.

FIG. 1 shows that the third duct portion 54 is formed to reside above the exhaust pipe 27 and to extend substantially horizontally from the engine compartment 2 toward the rear end of the vehicle body, e.g., at least partially below at least one of the seat 7 and the fuel tank 8. FIG. 11 shows that in one embodiment, the third duct portion 54 is defined at least in part by the upper frame portion 42 of the rearward frame portion 15 and a duct main body 66, which can be located on an upper side of the upper frame portion 42. The duct main body 66 can be made of any suitable material and through any suitable process, such as by molding a synthetic resin material. The third duct portion 54 is defined adjacent to the exhaust pipe 27 and at least one vehicle component, e.g., an external vehicle component such as the seat 7 or the fuel tank 8.

FIGS. 8, 9, 11, and 12 show that the duct main body 66 can include a portion having an inverted U shape in cross-section. In one embodiment, the duct main body 66 has lateral walls 67, 67, a front wall 68 (refer to FIG. 9), a rear wall 69, and an upper wall 70. The upper wall 70 connects upper ends of the lateral, front, and rear walls 67, 68, 69 to form a down-facing opening. In one manufacturing technique, the duct main body 66 is molded to a predetermined shape by a molding die. Any other suitable technique can be used. Further, the duct main body 66 can be coupled to the rear part frame 15 by bolts not shown in the drawing.

By attaching the duct main body 66 to the rear part frame 15 like this, an air passage 71 illustrated in FIGS. 11 and 12 can be formed. The air passage 71 can be formed by the upper frame portion 42 and by the walls defined by the duct main body 66. The air passage can be at least partially located between the exhaust pipe 27 and at least one of the fuel tank 8 and the seat 7.

Figure 9:
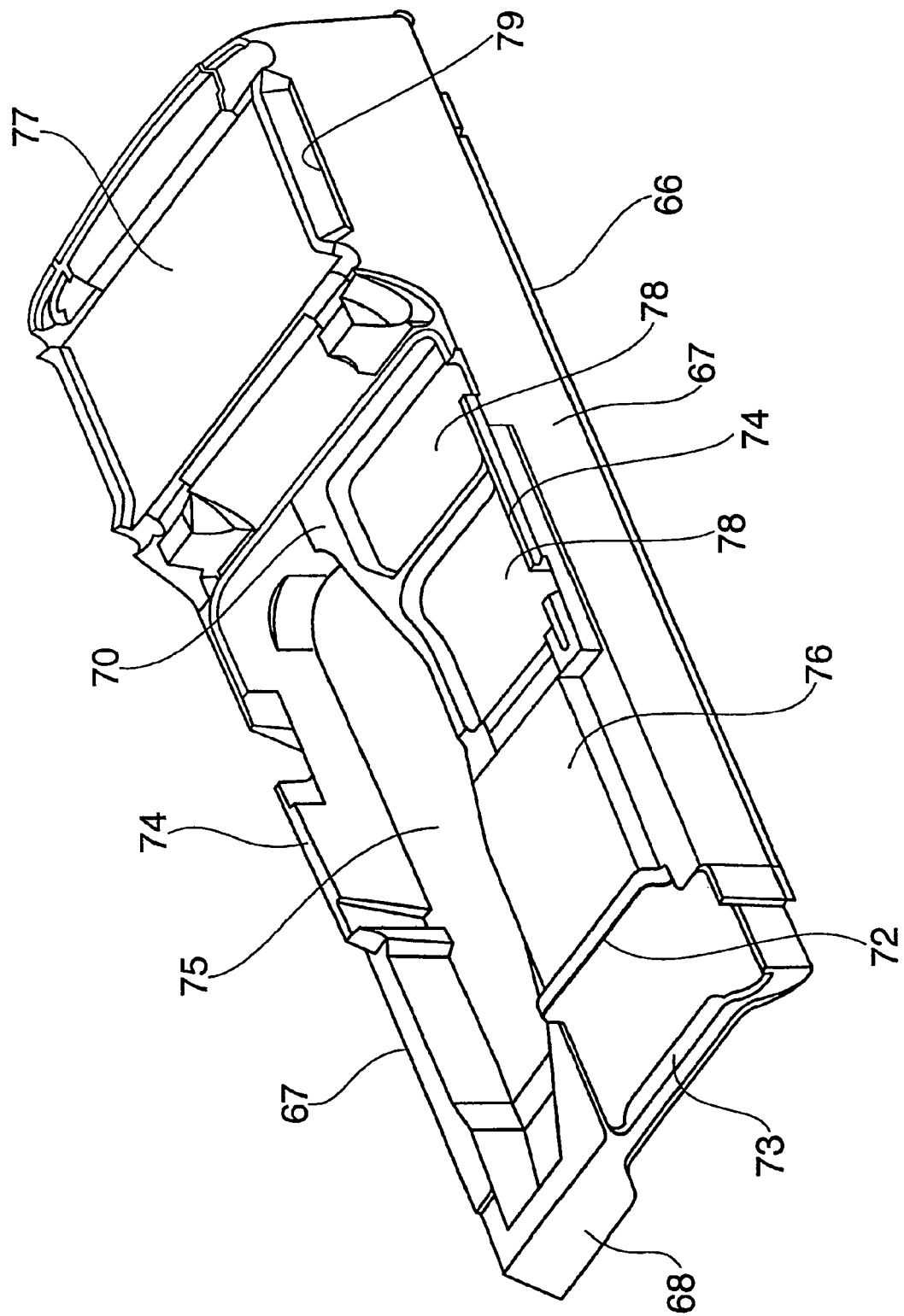
FIG. 9 is a perspective view of the duct main body.

With reference to FIG. 9, a connection port 72 for inserting and fitting a rear end of the second duct portion 53 is formed in a forward portion (upstream side) of this duct main body 66. A bridging portion 73 is formed in and extends transversely in a forward edge of the duct main body 66. The bridging part 73 is configured to enable the forward portion of the duct main body 66 to be coupled with or fixed to the upper frame portion 42. In one arrangement, the rear end of the second duct portion 53 can be connected to the bridging part 73 and the connection port 72.

FIG. 11 shows that in one embodiment, both lateral sides of the duct main body 66 comprise supports 74. The supports 74 can be configured to support at least one of the side parts of the seat 7 and the fuel tank 8. The supports 74 are configured to support and transmit loads from these (and other components in some embodiments) to other load-bearing frame structures of the snowmobile 1 and to a ground surface upon which or over which the snowmobile is positioned or travels. The supports 74 are supported by the longitudinal plate 41b of the side frame portion 41.

In one embodiment, the duct main body 66 is positioned over the exhaust pipe 27, which is positioned on the left-hand side of the vehicle body. Thus, a relatively wide space is formed to the right of the exhaust pipe 27. Accordingly, a storage or accommodation portion 75 that includes a recess or a recessed part that opens upwardly can be formed on a right side of the vehicle body. An air passage portion 76 can be formed on the duct main body 66 and can be located on the left side of the vehicle body. An air passage portion 76 can be formed on the duct main body 66 and can be located on another side of the vehicle body. The air passage portion 76 can include one or more lateral walls 67 and the upper wall 70. As shown in FIG. 9, the storage portion 75 is formed to extend from a forward portion of the duct main body 66 to a location forward of a muffler accommodation portion 77, discussed below.

That is, the right lateral side of the duct main body 66 can function as, among other things, a storage box. Additionally, a storage portion 78 (see FIGS. 9 and 11) that is relatively shallow and small can be formed in the air passage portion 76 of the duct main body 66.

FIGS. 4 and 12 show that the muffler accommodation portion 77 can be configured as a cover member and can be formed in a shape covering the opening 43 formed in a rearward portion of the upper frame portion 42. The muffler accommodation portion 77 can be formed like a box opening downward. The muffler 33 can be inserted into this opening 43 from above in one assembly technique. The upper wall 70 of this muffler accommodation portion 77 can be formed to be high compared to the air passage portion 76 located forward of the muffler accommodation portion to avoid an interference with the muffler 33. Additionally, both transverse side portions, which are the upper side portions of the air passage portion 76 can include air flow ports 79 for discharging the hot air.

The muffler accommodation portion 77 cooperates with a rear portion of the rearward frame portion 15 to define a cavity or space 81 which has transverse side walls, a rear wall, and which is opened downward. See FIGS. 1, 4, and 12. The space 81 is defined in one embodiment by the side frame portions 41 of the rearward portion 15, the upper frame portion 42, which extends laterally above the track belt 5 in the rearward portion 15, and the muffler accommodation portion 77. The space 81 can be formed in front of and above a two-dot chain line "A" depicted in FIG. 1.

In one embodiment, the exhaust system 28 includes the space 81, the forward branches 31 of the exhaust pipe 27, the collected pipe 32, and the muffler 33. The exhaust system 28 can include other components described herein that facilitate expelling of exhaust gas, e.g., one or more tail pipes 35, etc. In some embodiments, the exhaust system 28 includes the muffler accommodation portion 77.

In one embodiment, the duct main body 66 is fixed to the upper frame portion 42 forming the air passage 71 therebetween that terminates at the opening 43, which can be an air outlet. Air blown by the fan 55 is directed and flows through this air passage 71. The air is discharged to an outside of the third duct portion 54 through the opening 43 and the air flowing ports 79.

FIG. 4 shows that in one embodiment the muffler 33 is inserted in the opening 43. The muffler 33 is exposed to and cooled by the air discharged downward from the air passage 71 through the opening 43. FIGS. 1, 4, and 12 show that air (shown by white arrows in the drawings) is discharged downward through the opening 43 and is pushed toward the front of the snowmobile 1 by the rotating track belt 5. The air flows toward a forward portion of the vehicle body while being mixed with exhaust gas (shown by black arrows in the drawings) discharged from the tail pipe 35 in the space 81. The air from the air passage 71 and the exhaust air from the tail pipe 35 mixes in the location between the track belt 5 and the rearward frame portion 15.

Accordingly, in these embodiments of the snowmobile 1, the exhaust gas is discharged between the vehicle body and the lower track belt 5 inside the space 81, the load-carrying platform 10 can be provided in the rear part of the vehicle body and interference with the tail pipe 35 can be avoided. In particular, the load-carrying platform 10 will not be heated and will not be contaminated by exhaust gas from the tail pipe 35.

Also, in the embodiments discussed above, because the exhaust system 28 discharges the exhaust gas into the space 81, exhaust gas is substantially prevented from directly impinging on a person riding on a sled being towed behind the snowmobile, e.g., one that is connected to this snowmobile 1 by a towing lined, or impinging on baggage mounted on such a sled. Moreover, in the exhaust systems embodiments described above, if the steering skis 4 are deeply buried in the snow, exhaust gas will not directly impinging against a person working at the rear end of the vehicle body to free the snowmobile from the snow.

FIG. 12 also shows that since the exhaust system 28 by this embodiment discharges the exhaust gas into the downwardly opening space 81, the exhaust gas is substantially prevented form diffusing laterally over a wide range. Also, it is possible to attenuate the exhaust noise because the inside of the space 81 can act as an expansion chamber.

The rearward end of the rearward frame portion 15 by this embodiment can be formed of a suitable material and using a suitable process, e.g., by stamping a metal part or in a press, and the duct main body 66 having the muffler accommodation portion 77 can be formed by molding a synthetic resin. Thus, the space 81 can be easily formed in a suitable configuration, e.g., to open downwardly as discussed above.

Also, in some embodiments of the exhaust system 28, the muffler 33 is accommodated in the muffler accommodation portion 77. As such, the muffler 33 can have a large volume while maintaining sufficient clearance between the muffler 33 and the track belt 5.

Also, in the exhaust systems described herein, the exhaust gas is discharged toward the front of the vehicle body as the track belt 5 rotates. Accordingly, the exhaust gas is discharged laterally of the vehicle body while being pushed toward the front of the vehicle body by the rotating track belt 5.

Accordingly, in the exhaust systems described above, the exhaust gas is expelled from the space 81, so that the walls defining the space 81 (e.g., the muffler accommodation portion 77) are not excessively heated by the exhaust gas. If the walls were excessively heated, snow being splashed up by the track belt 5 against the walls (e.g., the muffler accommodation portion 77, a lower face of the rear end part of the upper part frame body 42, and a lower face of the load-carrying platform 10), the temperatures of these portions might become sufficiently warm to cause the snow to adhere and to coat these portions undesirably.

In particular, if the snow adheres to lower walls of the snowmobile 1, the accumulation can grow such that significant protrusions of snow can form on these lower walls. Such snow can firmly adhere to the snowmobile 1 and can also begin to form around outer surfaces. Because the wall temperatures are not greatly increased by the exhaust system, the snow generally will not excessively adhere to the snowmobile 1.

Further, because the exhaust systems by these embodiments discharges the exhaust gas to the outside of the vehicle and such exhaust flows toward the front of the vehicle by interaction with the drive of the track belt 5, the exhaust efficiency is improved.

Additionally, the guard plate 45 of the exhaust system 28 prevents the track belt 5 from contacting with an opening edge part of the space 81. Accordingly, notwithstanding the fact that the tail pipe 35 is provided in the vicinity of the upper part of the track belt 5, the tail pipe 35 is protected from being damaged by the track belt 5.

Although the embodiments mentioned above have been shown with the load-carrying platform 10, other vehicle component could be provided in the rear part of the snowmobile 1 instead of or in addition to platform. For example, a luggage box or other enclosed storage compartment could be provided in the rear end part of the snowmobile 1.

Further, in this embodiment, although there has been shown an example in which the space 81 is formed by the rear frame portion 15 and the duct main body 66, the space part concerned with the present invention can be formed at least in part by the upper frame portion body 42 of the rear frame portion 15. The space 81 can have a box-like construction in this embodiment using a suitable manufacturing process. For example, a molding process can be used to form the upper frame portion 42, or a box-like body can be attached, such as by welding, onto the upper frame portion 42.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An exhaust system for a snowmobile, the snowmobile comprising a forward portion in which an engine is mounted, a rearward portion, and a track belt for propelling the snowmobile, the exhaust system comprising:
   an exhaust pipe extending above the track belt from the engine to the rearward portion of the snowmobile, the exhaust pipe including a tail pipe having an outlet to the atmosphere;
   wherein the rearward portion of the snowmobile includes a space defined between a first lateral wall, a second lateral wall, and a rear wall, the space having an opening facing the track belt, the tail pipe being located in the space; and
   wherein the tail pipe is configured to discharge exhaust gas onto the track belt.

2. The exhaust system of claim 1, wherein the snowmobile includes a frame located in the rearward portion and being configured to substantially cover the track belt, the frame comprising at least one of the first lateral wall, the second lateral wall, and the rear wall and at least partially defining the opening of the space, the snowmobile further comprising a cover member coupled with the frame and configured to cover the opening from above.

3. The exhaust system of claim 2, further comprising a muffler coupled with the exhaust pipe and at least partially surrounded by the cover member.

4. The exhaust system of claim 3, wherein the snowmobile further comprises a load-carrying platform located behind the space.

5. The exhaust system of claim 2, wherein the snowmobile further comprises a load-carrying platform located behind the space.

6. An exhaust system for a snowmobile, the snowmobile comprising a forward portion in which an engine is mounted, a rearward portion, and a track belt for propelling the snowmobile, the exhaust system comprising:
   an exhaust pipe extending above the track belt from the engine to the rearward portion of the snowmobile, the exhaust pipe including a tail pipe having an outlet to the atmosphere;
   wherein the rearward portion of the snowmobile includes a space defined between a first lateral wall, a second lateral wall, and a rear wall, the space having an opening facing the track belt, the tail pipe being located in the space; and
   wherein the tail pipe comprises a downstream end and an upstream end located between the downstream end and the exhaust pipe, wherein the tail pipe is configured such that when the exhaust system is mounted to the snowmobile, the outlet of the tail pipe is located at an elevation below the upstream end of the tail pipe and faces toward the forward portion of the snowmobile.

7. The exhaust system of claim 6, further comprising a guard plate coupled with the rearward portion of the snowmobile, the guard plate configured to covers at least a lower portion of the tail pipe.

8. The exhaust system of claim 7, wherein the snowmobile further comprises a load-carrying platform located behind the space.

9. The exhaust system of claim 6, wherein the snowmobile further comprises a load-carrying platform located behind the space.

10. The exhaust system of claim 1, wherein the snowmobile further comprises a load-carrying platform located behind the space.

11. The exhaust system of claim 1, wherein the tail pipe comprises a downstream end and an upstream end located between the downstream end and the exhaust pipe, wherein the tail pipe is configured such that when the exhaust system is mounted to the snowmobile, the outlet of the tail pipe is located at an elevation below the upstream end of the tail pipe and faces toward the forward portion of the snowmobile.

12. The exhaust system of claim 11, further comprising a guard plate coupled with the rearward portion of the snowmobile, the guard plate configured to covers at least a lower portion of the tail pipe.

13. The exhaust system of claim 12, wherein the snowmobile further comprises a load-carrying platform located behind the space.

14. The exhaust system of claim 11, wherein the snowmobile further comprises a load-carrying platform located behind the space.

15. A snowmobile, comprising:
a frame having a forward portion and a rearward portion;
an engine mounted in the forward portion of the frame;
a track belt for propelling the snowmobile coupled with the rearward portion of the frame;
an exhaust pipe extending above the track belt and behind the engine, the exhaust pipe including a rear portion having an outlet to the atmosphere; and
a cavity at least partially defined by the frame and comprising a rear wall and an opening that faces the track belt;
wherein the rear portion of the exhaust pipe extend through the cavity and the outlet is forward of the rear wall.

16. The snowmobile of claim 15, wherein the frame comprises a first lateral wall, a second lateral wall, the first and second later walls and the rear wall and at least partially defining the opening of the cavity.

17. The snowmobile of claim 16, further comprising a cover member coupled with the frame and configured to cover the opening of the cavity from above.

18. The snowmobile of claim 17, further comprising a muffler coupled with the exhaust pipe and located between the cover member and the opening of the cavity.

19. The snowmobile of claim 15, further comprises a load-carrying platform located behind the cavity.

20. The snowmobile of claim 15, wherein the rear portion of the exhaust pipe comprises a tail pipe.

21. The snowmobile of claim 15, wherein the rear portion of the exhaust pipe comprises a downstream end and an upstream end located between the downstream end and a forward portion of the exhaust pipe, wherein the rear portion of the exhaust pipe is configured such that when the exhaust system is mounted to the snowmobile, the outlet of the rear portion is located at an elevation below the upstream end of the rear portion and faces toward the forward portion of the frame.

22. The snowmobile of claim 15, further comprising a guard plate coupled with the rearward portion of the frame and configured to cover at least a lower portion of the rear portion of the exhaust pipe.

23. The snowmobile of claim 15, wherein the exhaust gas expelled from the exhaust pipe is directed onto the track belt.

24. A snowmobile, comprising:
a frame;
an engine mounted in a forward portion of the frame;
a track belt for propelling the snowmobile coupled with the frame;
an exhaust pipe extending above the track belt and behind the engine and being configured to discharge exhaust gas onto the track belt, the exhaust pipe including a rear portion having an outlet to the atmosphere; and
means for carrying a load behind the snowmobile; and
means for preventing exhaust gas from the exhaust pipe from impinging upon the load-carrying means.

25. An exhaust system for a snowmobile comprising an engine, a track belt for propelling the snowmobile, and a seat upon which an operator can sit, the exhaust system comprising an exhaust pipe extending rearward from the engine under the seat, the exhaust pipe configured to discharge exhaust gas onto the track belt.

* * * * *

UNITED STATES PATENT AND TRADEMARK OFFICE
CERTIFICATE OF CORRECTION

| | |
|---|---|
| PATENT NO. | : 7,448,462 B2 |
| APPLICATION NO. | : 11/335264 |
| DATED | : November 11, 2008 |
| INVENTOR(S) | : Toyochika Etou |

Page 1 of 1

It is certified that error appears in the above-identified patent and that said Letters Patent is hereby corrected as shown below:

At Col. 2, line 41 (Approx.), please change "sytem." to --system.--.

At Col. 14, line 53, In Claim 7, please change "covers" to --cover--.

At Col. 15, line 6, In Claim 12, please change "covers" to --cover--.

At Col. 15, line 29, In Claim 16, please change "later" to --lateral--.

Signed and Sealed this

Twenty-first Day of April, 2009

JOHN DOLL
*Acting Director of the United States Patent and Trademark Office*